United States Patent
Ichiki et al.

[15] 3,643,118
[45] Feb. 15, 1972

[54] ROTARY MACHINE
[72] Inventors: Toshinobu Ichiki; Hironori Okuda, both of Hitachi; Keiji Arai, Kita-Ibaraki, all of Japan
[73] Assignee: Hitachi, Ltd., Tokyo, Japan
[22] Filed: Apr. 30, 1970
[21] Appl. No.: 33,289

[30] Foreign Application Priority Data

May 2, 1969   Japan.................................44/33610

[52] U.S. Cl..............................310/40, 310/179, 310/258
[51] Int. Cl........................................................H02k 1/12
[58] Field of Search................310/40, 46, 42, 172, 173, 174, 310/179, 187, 177, 171, 254, 256, 258

[56] References Cited

UNITED STATES PATENTS

2,136,301  11/1938  Hoddy......................................310/40
2,465,824  3/1949  Thomas...................................310/254
2,704,334  3/1955  Brailsford................................310/46
2,780,741  2/1957  Lynn.........................................310/177
3,293,467  12/1966  Favre......................................310/187

*Primary Examiner*—L. T. Hix
*Assistant Examiner*—R. Skudy
*Attorney*—Craig, Antonelli and Hill

[57] ABSTRACT

A rotary machine comprising a stator having magnetic poles each provided with a stator winding, and an armature mounted for rotation within said stator and provided with an armature winding. Each of said magnetic poles is integrally formed at the end thereof with two oppositely directed polepieces which are aligned along the surface of said armature with a gap therebetween, said two polepieces being bisymmetrical so as to provide a larger sectional area of the magnetic path through a trailing one of said two polepieces in the rotating direction of the armature than that through a leading one of said two polepieces, whereby the output capacity of the rotary machine is increased.

10 Claims, 11 Drawing Figures

INVENTOR
TOSHINOBU ICHIKI
HIRONORI OKUDA
KEIJI ARAI
BY Craig, Antonelli, Stewart & Hill
ATTORNEYS

FIG. 11

ROTARY MACHINE

This invention relates to rotary machines such as a commutator motor, commutator generator, DC motor and DC generator, and more particularly to a rotary machine being small in size and having no commutating pole, which machine is used as a driving source, e.g., in electrical appliances used for the common home.

The rotary machine of the type has hitherto had its magnetic poles on a stator core manufactured bisymmetrically, and the magnetic paths of the magnetic pole portions tend to have a partiality towards the direction of reversal in a motor and towards the direction of rotation in a generator under the influence of the armature reaction which inevitably occurs during operation. Since the armature reaction causes deterioration in commutation, there has heretofore been an approach in which airgaps near the magnetic pole portions are made larger or a system in which the cross-sectional area of the magnetic poles near here is made smaller, in order to suppress the armature reaction to the minimum. With large airgaps, however, the effective total amount of magnetic fluxes will decrease, and in case of machines with a brush, although improvements in commutation are attained, undesirably the output power will be reduced.

As the magnetic paths in the vicinity of the magnetic poles exhibit partiality due to the armature reaction, there is a tendency that the iron core is magnetically saturated at some parts of the magnetic poles, while it is not effectively utilized at other parts. With this in mind, the inventors measured magnetic flux at various parts of the stator core by means of a Hall generator or a search coil, and then calculated the magnetic flux density due to the flux, determined the shapes of the stator cores possessing the most effective utilization factor, and thus attained an increase in the output power without increasing the outside dimensions. Although any increase in the power will usually become a main cause for deterioration in commutation, the present invention provides a rotary machine with a construction free from any deterioration in commutation.

An object of the invention is to provide a rotary machine with an increased output power without any increase in external dimensions.

Another object is to provide polepieces which are nonbisymmetric with respect to the geometrical neutral line of magnetic poles, thereby to increase the total amount of magnetic flux.

Another object is to modify the configuration of stator yokes, thereby to further increase the total amount of magnetic flux.

Another object is to reduce the number of turns of the stator winding, thus to provide an inexpensive rotary machine.

Another object is to shift the positions of notches in the stator core to commutate magnetic flux passing from the right and left yokes, whereby the amount of flux is increased and simultaneously the efficiency is improved and whereby the commutation is improved.

The invention is concerned with rotary machines, but the following description will be made with reference to a commutator motor for the sake of convenience. The scope of the invention, however, is not restricted to the commutator motor, but is applicable to such various rotary machines as referred to above.

FIGS. 7 to 11 show several embodiments of the invention, respectively, in which

Figure 1:
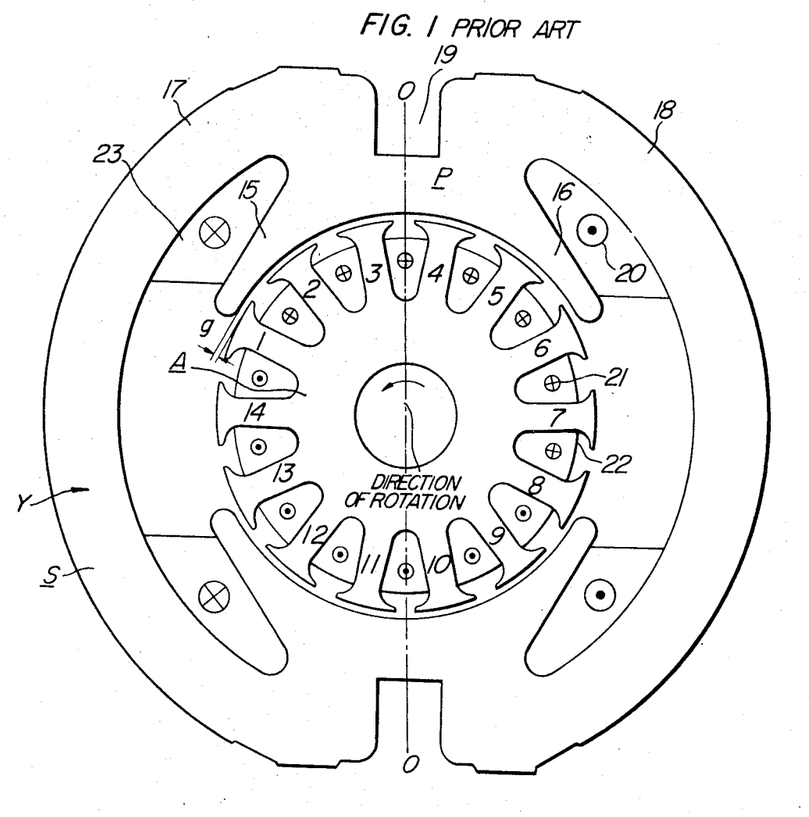
FIG. 1 shows the sectional configuration of a stator core and an armature core of a prior art commutator motor, the latter core being rotatably disposed within the former core, with both the cores being schematically represented while with the outside supporting means, etc., being omitted from the drawing.
Figure 2:
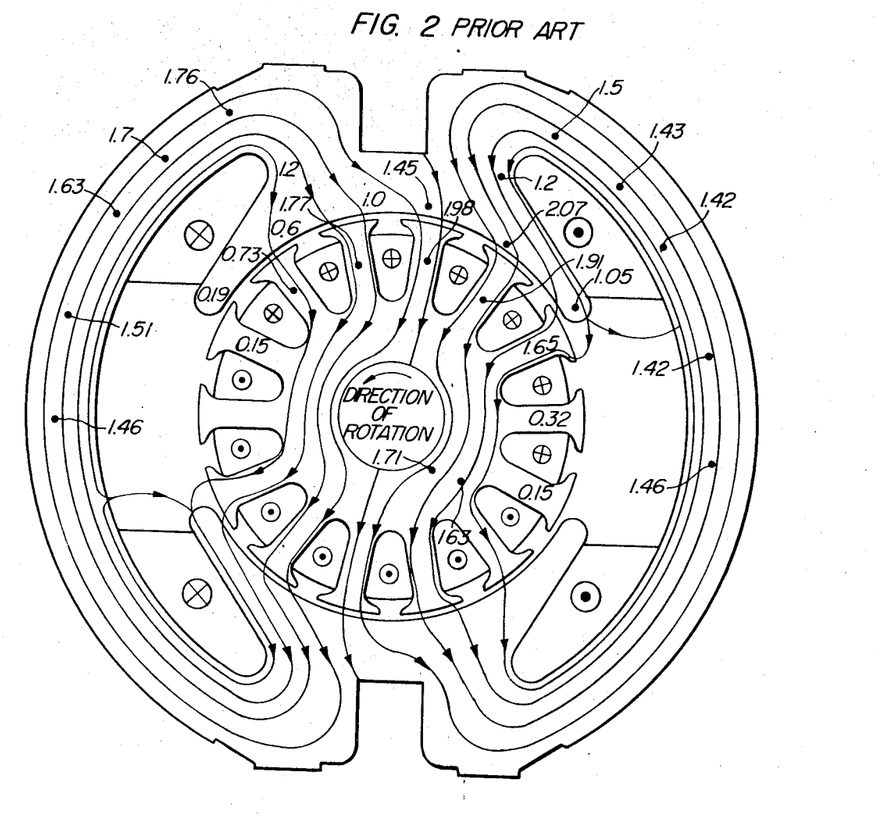
FIG. 2 shows, the operation of the commutator motor constructed as in FIG. 1, the state of the distribution of magnetic flux through the stator core and the armature core, wherein numerals represent the values of magnetic flux density at various positions.
Figure 3:
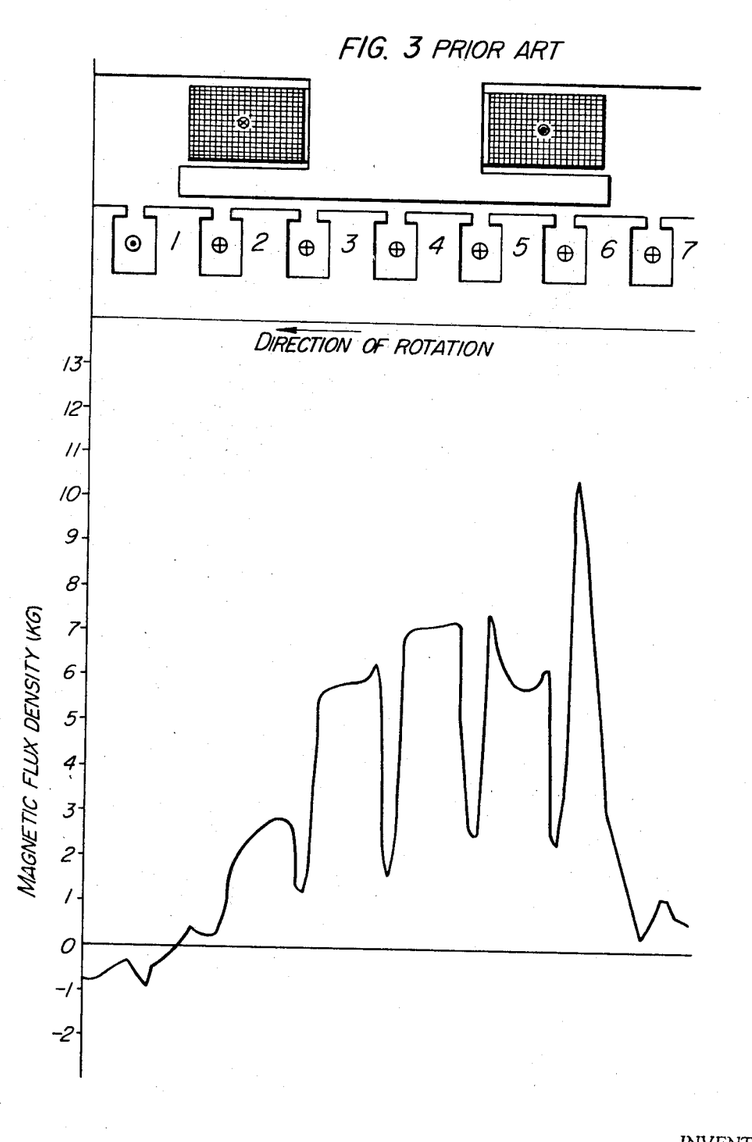
FIG. 3 is a graph showing, likewise in the prior art, the magnetic flux density in the gaps between the magnetic poles formed in the stator core and armature.

Referring to FIGS. 1 to 3, a prior art construction and the distribution of magnetic flux therein will be described. A represents an armature core having 14 teeth, which are respectively designated by numerals 1 to 14 for convenience' sake. S designates a stator core of two poles, which is integrally provided with magnetic poles P. The extreme ends of the magnetic poles P form pole pieces 15 and 16 bisymmetrical with respect to the geometrical neutral line 0—0 of the magnetic poles. Y represents yokes of the stator core, and herein the polepieces 15 and 16 are distinctly termed "the polepiece in the direction of rotation" and "the polepiece in the direction of reversal," respectively. Numeral 17 indicates that position of the yoke Y which is opposed to the polepiece 15 in the direction of rotation and which is called "the opposed core," while numeral 18 designates that position of the yoke Y which is opposed to the polepiece 16 in the direction of reversal and which is also termed "the opposed core." Numeral 19 represents notches which are required in the process of assembly. The yokes Y, the magnetic poles P, the polepieces 15 and 16, the opposed cores 17 and 18, and the notches 19 referred to hereinabove are usually provided by laminating silicon-steel plates which are integrally press worked. The polepieces 15 and 16, however, may be also magnetically secured to the poles P in the form of separate pieces. At 20 is designated a stator winding, which when wound on the magnetic poles P finishes the stator. Numeral 21 designates an armature winding which is inserted into and disposed in slots 22 formed in the outer periphery of the armature A, and winding of the armature winding 21 onto the armature A will complete the armature A. Numeral 23 refers to slots formed in the stator core S, and in which the stator winding 20 is disposed.

As a result of various considerations to attain a further miniaturization in the prior art construction thus far described, the inventors decided to measure the utilization factor of the iron cores to study whether or not they are effectively utilized as a whole. In the measurement it is only required to find the flux density at various positions, and a Hall generator and a search coil, both being well known, were used. The results of the measurements are shown as the numerical values shown in FIG. 2 indicating flux density at various positions, and as per the graph shown in FIG. 3 for the flux density at the gaps $g$. It was confirmed as also apparent from FIGS. 2 and 3 that the flux density distribution inclines towards the direction of reversal due to the armature reaction during the running period of the commutator motor, whereby the stator core is bisymmetric, but nevertheless that the polepiece portion 15 the direction of rotation has such low flux densities as 0.19, 0.6, and 1.0 Wb/m.² thus not efficiently utilizing the iron core, whereas the polepiece portion 16 in the direction of reversal exhibits such high densities as 1.05, 2.07 and 1.45 Wb/m.² thus utilizing the core under considerably saturated conditions. However, the cross section of magnetic paths flowing from the side of the pole shoe 15 in the direction of rotation to the armature A, will extend to the portion in the direction of reversal and be fairly large on the surface of the magnetic pole P, so that the total amount of magnetic flux increases. Numbers given in FIG. 2 reveal the value of 1.76 Wb/m.² which is 17 percent larger when compared with that of the opposed core 18 in the direction of reversal of 1.5 Wb/m.². It was accordingly made sure that, with the prior art stator core S, apart from the poor utilization factor of the magnetic poles P, problems are also encountered with the design of the yoke Y itself. It was jointly made sure that the pole shoe portion 16 in the direction of reversal is fully saturated rather than having a high flux density, and hence that it is considerably high in magnetic reluctance.

According to the results of the analysis of these phenomena, it was expected that if the magnetic flux density were made uniform, the total amount of flux would be increased to obtain a commutator motor of good efficiency and consequently to attain an increase in the output.

In view of the above, it was suggested as an improved construction that the gaps on the lower flux density side be made smaller thereby to provide an easy passage for the flux, whereas the gaps on the higher flux density side were to be formed larger thereby to make the passage of the flux difficult, whereby a uniform distribution of the magnetic flux would be attained.

The results obtained, however, were contrary to expectations. And, the commutator motor became poor in efficiency with the total magnetic flux reduced and without any increase in the output. This is due to the fact that the side on which the flux density was originally lower is not made any higher in flux density by narrowing the gaps. More specifically, it is considered that the absolute amount of magnetic flux to pass through the gap $g$ is small, as shown in FIG. 2, in that of the tooth portion 1 or 2 of the armature A due to an electromotive force in the armature reaction, and hence the reduction in the width of the gaps $g$ will not increase the flux density so much, whereas the side on which the flux density was higher is subjected to an abrupt decrease in the density and thus the amount of flux is reduced. In order to increase the total amount of magnetic flux at such unequal intervals, it is required to make large the cross-sectional area of all the magnetic paths and to set a small flux density. It was, however, found difficult to increase the amount of flux to a value higher than that in the uniform gaps $g$ even when employing such measures, and thus it was revealed that an increase in the amount of flux with nonuniform gaps $g$ is difficult to attain.

It was confirmed from the above discussions that in order to obtain a commutator motor increased in the total amount of flux for an increase in output power, it is more suitable for accomplishment of the purpose to permit the passage of the most possible flux at portions where the amount of flux is high, rather than to produce a uniform distribution of the magnetic fluxes.

Referring again to FIG. 3, the flux distributions at the teeth portions 5 and 6 of the armature A are such that the right portions thereof fall off extremely.

Figure 4:
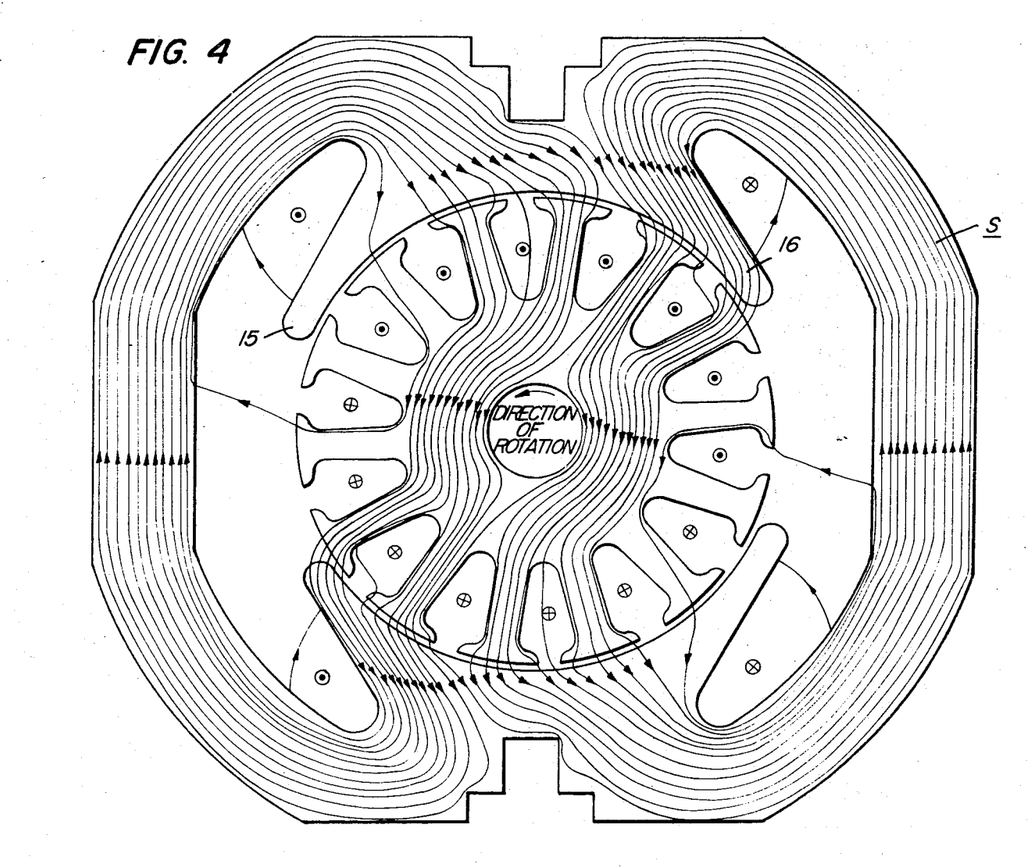
FIG. 4 shows in section the configuration of a stator core and an armature core according to an embodiment of the invention, along with the path of magnetic flux.
Figure 5:
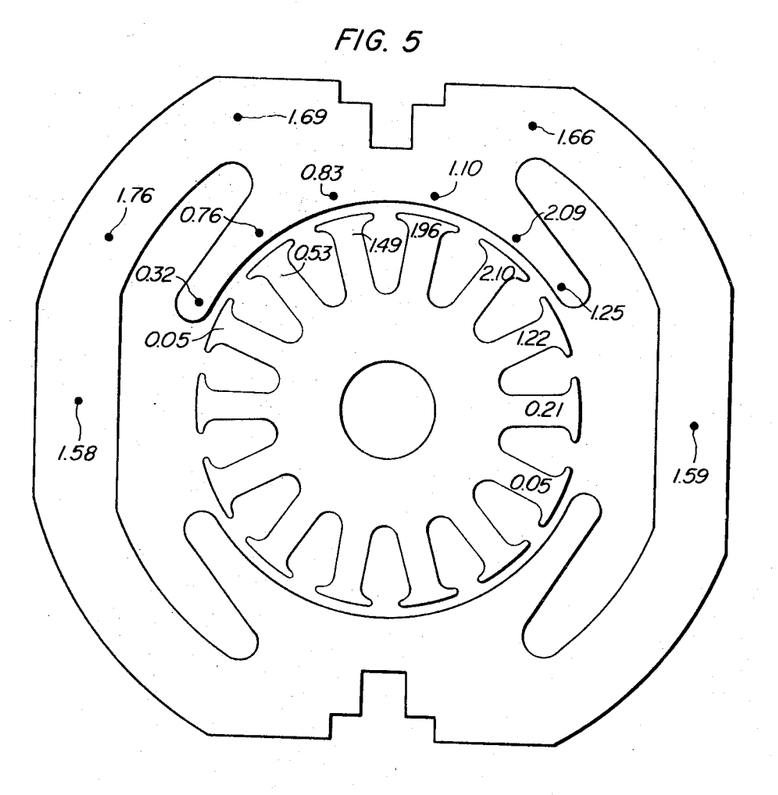
FIG. 5 is a diagram showing the magnetic flux density at various positions on the stator core and the armature core.
Figure 6:
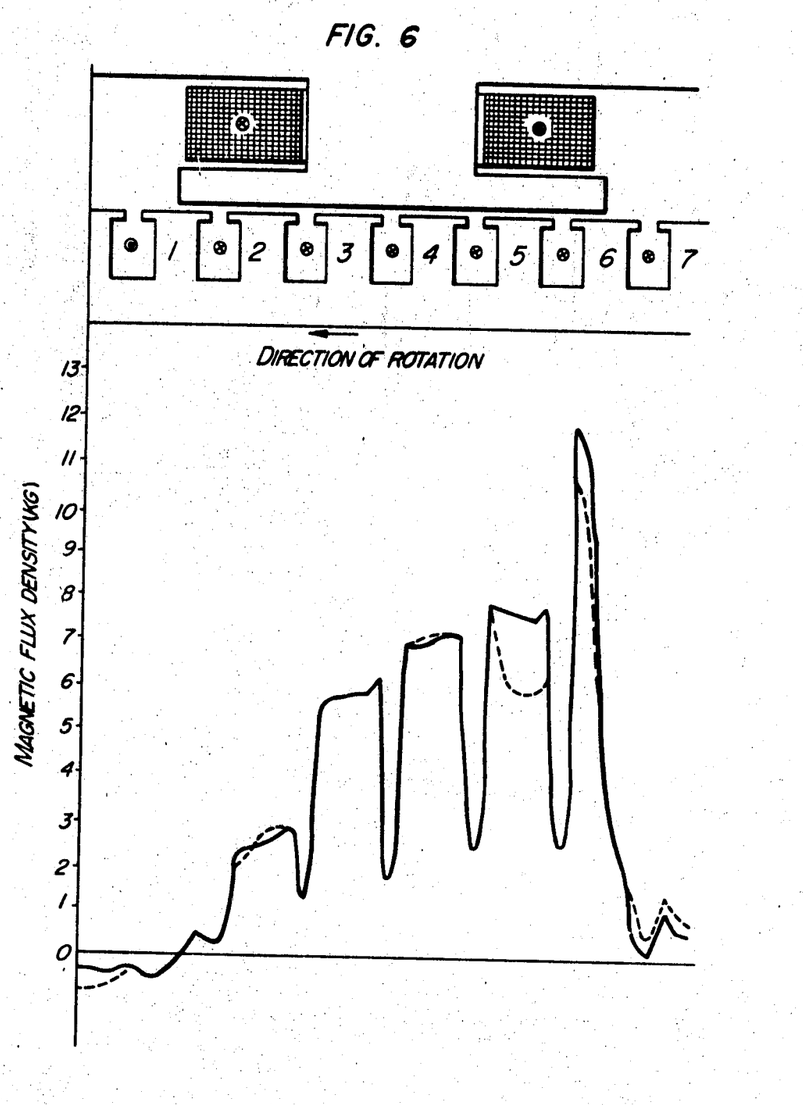
FIG. 6 is a diagram for comparison of the flux density distributions in the gaps, between the construction of the invention and that of the prior art.
Figure 7:
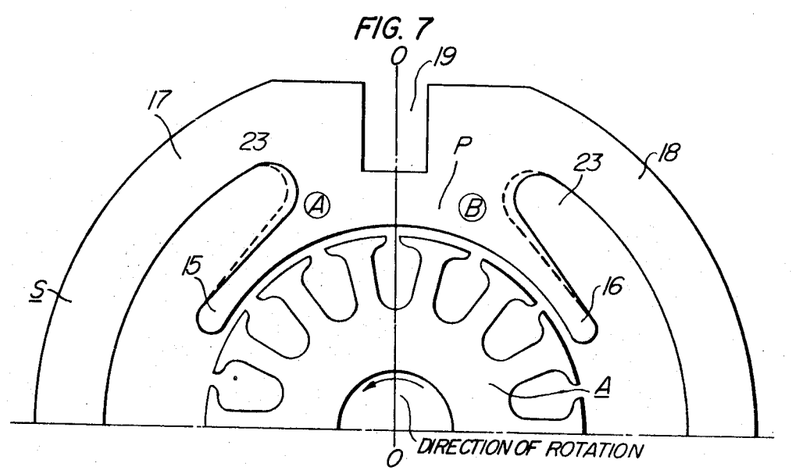
FIG. 7 is a section of the first embodiment constituting the essential part of the present invention.

This indicates that the polepiece portion 16 in the direction of reversal in FIG. 1 undergoes magnetic saturation, thereby largely increasing the magnetic reluctance. In contrast, the pole shoe portion 15 in the direction of rotation has a low flux density, and is disadvantageously constructed so as to allow an easy passage of leakage flux due to the stator winding 20 and of magnetic fluxes due to the armature reaction. A construction improved in this point is shown in FIG. 4, wherein the cross-sectional area of the pole shoe portion 16 in the direction of reversal, which portion is integrally formed in the stator core S, is made large (thick) thereby to provide an easy passage for the flux, while the cross-sectional area of the pole shoe portion 15 in the direction of rotation is rendered small (thin) thereby to provide a difficult passage for the flux, whereby the magnetic reluctance against the leakage flux as well as the flux due to the armature reaction is increased. The whole construction is as shown by full lines in FIG. 4. FIG. 7 is a drawing for making a comparison between the construction of an embodiment as shown in FIG. 4 and the prior art construction, the latter being represented by dotted lines in the comparing figure. With such improved construction, the flux distribution as a whole is as shown by the diagram of magnetic flux in FIG. 4, and there will be understood the tendency therein that the flux density on the side of the polepiece 16 in the direction of reversal is made extremely high. This construction has the flux density measured at various positions thereof by the same method as that previously described and the values are given by numerals (in Wb/m.²) in FIG. 5. As is clear from this figure, the magnetic flux density at the polepiece 15 in the direction of rotation and the pole shoe 16 in the direction of reversal is very high at the latter part 16, but the opposed iron core portions 17 and 18 exhibit approximately the same degree of magnetic flux density, so that the iron cores may be efficiently utilized when used in a region of appropriate saturation. The distribution of the flux density in the gap portions $g$ with this construction is graphically shown by full lines in FIG. 6, in which dotted lines represent the distribution of the flux density with the prior art machine. As is also apparent from this figure, the flux density which drops to the extreme extent, especially at the part of tooth 5, has been raised as shown by the full lines, thus increasing the total amount of magnetic flux by 10 percent or so.

Although an increase in the cross-sectional area of the polepiece 16 in the direction of reversal will increase the flux due to the armature reaction, teeth portions 5 and 6 will also approach the magnetic saturation point, so the flux due to the armature reaction are not considerably increased and there was observed a tendency to decrease at the teeth portions 1 and 7. It is to be understood that when a brush (not shown) is located at the teeth portions 1 and 7 in FIG. 6 (which portions have a lower flux density than in the symmetric magnetic poles), commutation will be improved over the prior art devices.

Since a single-phase small-sized commutator motor generally includes no interpole, it is common practice to shift the brush location to the direction of reversal to improve the commutation.

However, when the armature reaction is remarkably strong, the main flux will have large variations and hence no flux to produce the required electromotive force for commutation may be obtained. There are two ways to suppress the armature reaction; in one of them, the gaps $g$ are widened, while in the other, the number of turns of the armature winding 21 is reduced. These ways, however, are disadvantageous in the following: With the foregoing construction a commutator motor of the same capacity and the same number of rotations will be large in size, which is contrary to the commonly desired miniaturization and is not desirable.

According to the construction of an embodiment as shown in FIG. 4, however, with a field magnetomotive force and the amount of flux as in the prior art, the main flux may be increased or a further miniaturization and reduction in cost may be expected, or by slightly enlarging the gap width of the gap portions $g$ or decreasing the number of turns of the armature winding 20, improvements in commutation are still more advanced.

Figure 8:
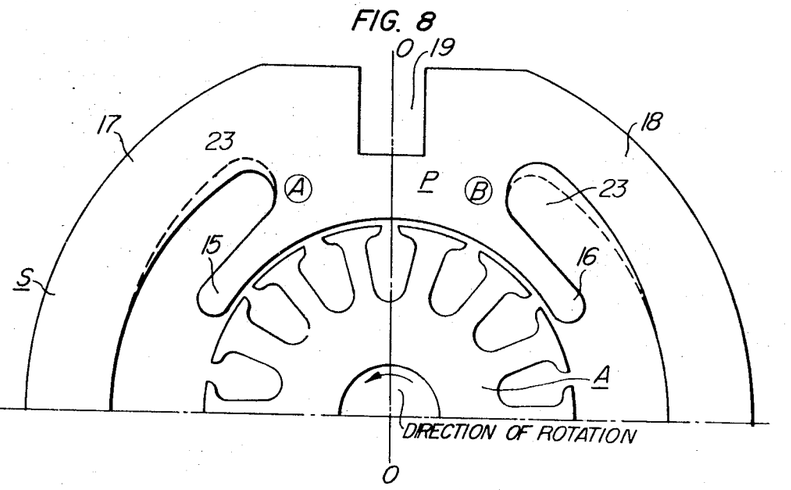
FIG. 8 is a schematic section of the second embodiment.

As a result of studying the flux distribution at the stator core portion S in the prior art construction as shown in FIG. 1, it was revealed that the opposed core portion 18 has less flux density, than the opposed core portion 17. Therefore, the cross-sectional area of the opposed core 18 may be made smaller than that of the opposed core 17 without any trouble, and obviously, if the cross-sectional area of the opposed core 17 is set slightly larger than in the prior art in order to increase the amount of magnetic flux, a still higher efficiency will be attained. More specifically, the cross-sectional area of the magnetic path flowing from the polepiece portion 15 in the direction of rotation into the armature A is very large, and hence, although the flux density at the pole shoe 15 in the direction of rotation is low, the total amount of flux, which naturally increases the amount of flux passing through the opposed core 17 becomes high. Thus, with a large cross-sectional area of the magnetic path of the opposed core 17, still more flux will flow to increase the output. In contrast, at the opposed core part 18 in the direction of reversal, in spite of the pole shoe portion 16 in the direction of reversal being magnetically saturated the flux density is low, and hence the iron core is not effectively used. Accordingly, the cross-sectional area of the opposed core portion 18 may be designed to be somewhat smaller without any detrimental effects. This is a very advantageous point, as will be described later, regarding the miniaturization of the machine. More specifically, the space for winding therein the stator winding 20 or the space of the slot 23 has the minimum possible value. For example, if the cross-sectional area of the polepiece is made large, the space of the slot 23 will become smaller by just that amount and there will be no other means of settlement than increasing the outside dimensions of the yoke Y in order to reasonably wind the stator winding 20. According to the second embodiment of the invention as shown in FIG. 8, the yoke Y may increase the whole amount of magnetic flux and still may be made nonbisymmetric. Especially, by making thick the opposed core 17 on the side of the polepiece 15 in the direction of rotation whereas by thinly forming the opposed core 18 on the side of the polepiece 16 which core has a large cross-sectional area, the minimum required space of the slot 23 for therein winding the stator winding 20 may be insured without any increase in the outside dimensions of the stator core S. This will result in an increase in the total amount of flux as previously referred to, and advantageously achieves an increase in the output. Although a larger cross-sectional area of the opposed core 17 increase leakages flux near the magnetic poles P, the cross-sectional area of the polepiece 15 in the direction of rotation which area is set at a small value as shown in FIG. 7, will increase the magnetic reluctance of this portion, thus enabling an increase in the leakage flux to be suppressed. On the contrary, although a large cross-sectional area of the pole shoe 16 in the direction of reversal and as shown in FIG. 3 will similarly increase the leakage flux to the above description, such increase in the leakage flux may be suppressed by setting a small cross-sectional area for the opposed core 18. It is thus possible to accomplish, as a whole, improvements in the commutation of a commutator motor.

As described above, there are two means to improve the efficiency and thereby to increase the output; one is to render nonbisymmetric the cross-sectional areas of the cores near the magnetic poles p of the stator core S, while the other is to make different the cross-sectional areas of the polepieces 15 and 16. It is a construction shown in FIG. 9 which employs both the means simultaneously, and the construction has a further increase in the output when compared with any construction in which either one means is performed.

Figure 9:
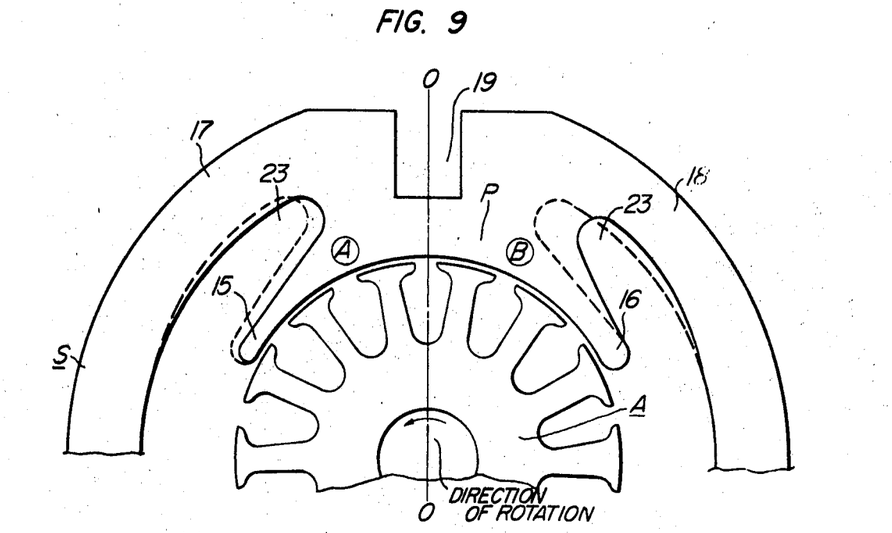
FIG. 9 is a schematic section of the third embodiment.

In addition, this serves to suppress the magnetic flux due to the armature reaction, and is much preferred to the desired improvements in commutation. A construction shown by dotted lines in FIG. 9 is one of the prior art.

Figure 10:
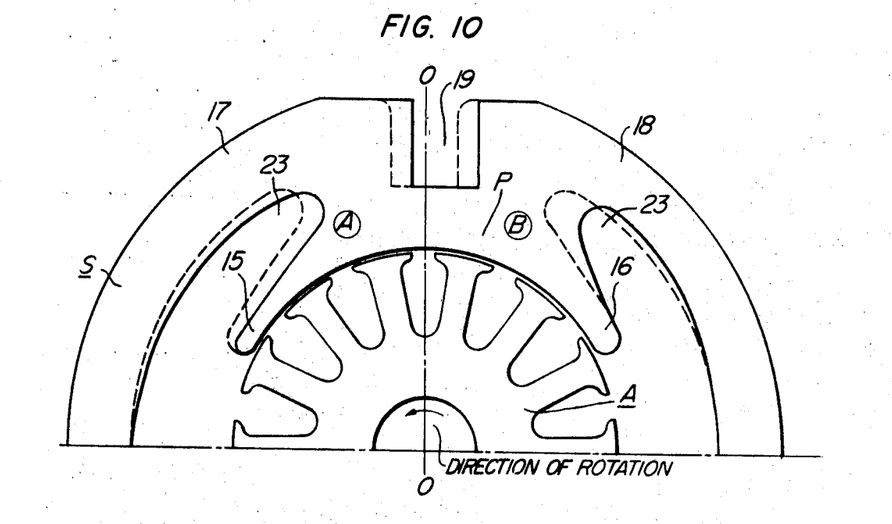
FIG. 10 is a schematic section of the fourth embodiment.

When, as the third embodiment shown in FIG. 10, the notch 19 formed on the stator core portion S is moved slightly towards the direction of reversal away from the geometrical neutral line 0—0 of the magnetic poles p, the cross-sectional area of the magnetic path of the opposed core portion 17 on the side of the direction of rotation will become large. Naturally, the cross-sectional area of the magnetic path of the opposed core portion 18 on the side of the direction of reversal becomes small. Then, the total amount of flux is increased for the foregoing reasons, and the utilization factor of the stator core S is still more improved, whereby an increase in the output may be attained. FIG. 10 shows by full lines the construction in which the first and second constructional measures are included, and by dotted lines the prior art construction.

In some prior art commutator motors, the widths of the gaps g are made unequal for the purpose of improving commutation. Through combination of the unequal gaps and the various constructions embodying the present invention, it is possible to obtain a commutator motor which is more effective in efficiency and in commutation. As is clear in FIG. 2, the flux due to the armature reaction is higher at the teeth portions 1 and 2 than at the teeth portions 5 and 6. Accordingly, by making the gaps g narrow between the polepiece 16 in the direction of reversal and the teeth 5 and 6 and wide between the polepiece 15 in the direction of rotation and the teeth 1 and 2, the amount of flux on the side of the polepiece 16 in the direction of reversal is increased to increase the total amount of flux thereby to improve the efficiency, and simultaneously, the magnetic reluctance on the side of the polepiece 15 in the direction of rotation is increased to improve the commutating action. This construction is given in FIG. 11 as the fourth embodiment. With the prior art construction in which the polepieces are bisymmetric and which employs the unequal gaps g, it was impossible to expect an increase in the amount of flux because of the magnetic saturation of the pole shoe portion 16 in the direction of reversal.

It is not preferable from the viewpoint of improving commutation to narrow the gaps on the side of the polepiece 16 in the direction of reversal. However, the teeth portions 5 and 6 are magnetically saturated to prevent the flux due to the armature reaction from flowing, and the gap width on the side of the polepiece 15 in the direction of rotation has been extended. Improvements in commutation may therefore be attained. This construction is as shown by the full lines in FIG. 11, in which dotted lines depict the prior art construction.

Figure 11:
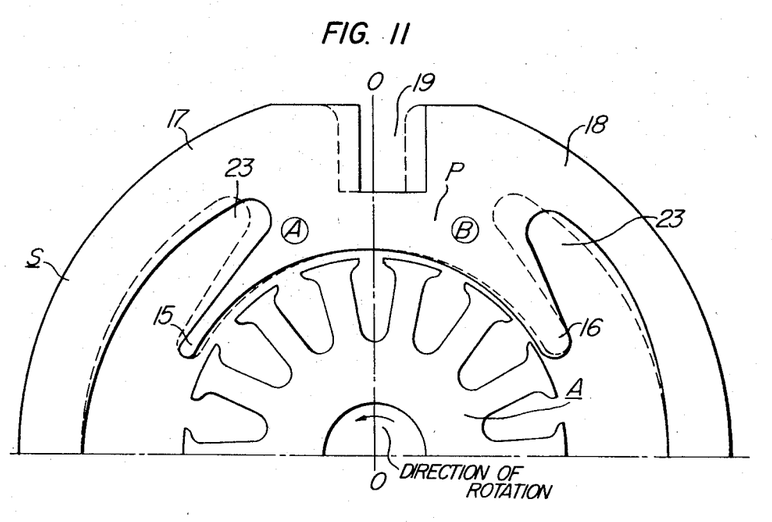
FIG. 11 is a schematic section of the fifth embodiment.

With the above-described nonbisymmetric magnetic poles P, their base portions tend to be widened. For this reason, the stator winding 20 wound on the magnetic poles P would prove to be of uneconomic length. Therefore, as shown in FIGS. 9 to 11, the polepiece 15 is formed thinly as far as possible, and simultaneously, construction is made in such a manner that the bottommost part of the slot portion 23 or point Ⓐ is brought as near as practicable toward point Ⓑ, whereby the stator winding 20 is permitted to be short.

Since the copper loss of the stator is in proportion to the length of a conductor for a fixed cross-sectional area, it will be reduced with a shorter length at the same number of turns, thus enabling an increase in the output power.

Although description has been made of a commutator motor, the invention may be applied to a commutator generator, a DC motor, a DC generator, and other rotary machines.

More specifically, since in a generator the magnetic flux is shifted towards the direction of rotation under the influence of the armature reaction, the cross-sectional area of a polepiece on the side of the direction of rotation is made larger relative to that of a polepiece in the direction of reversal, while the relation is reversed as to the cross-sectional area of the opposed iron cores. Further constructions of a generator are reverse in nature to a motor, so that the invention is readily applicable by reversing the construction of each embodiment thereof.

Various modifications in construction may be made within the scope of the appended claims.

What is claimed is:

1. A rotary machine comprising a stator core, a plurality of magnetic poles each having two oppositely extending pole pieces integrally formed at its extreme ends, a stator winding which is disposed in slots formed between said magnetic poles and a yoke and which is wound on said magnetic poles, an armature rotatably supported in said stator core, and an armature winding disposed in slots of said armature and wound on each tooth, said polepiece which extends in the direction of reversal of said armature having a larger cross-sectional area of the magnetic path thereof relative to that of the other of said polepieces which extends in the direction of rotation of said armature, the gap between all of said magnetic poles and said armature being substantially uniform.

2. A rotary machine comprising a stator core, magnetic poles each having one end fixed to said stator core and provided with a stator winding, an armature rotatably supported in said stator core and having an armature winding, wherein each of said magnetic poles is formed at the other end thereof with two oppositely directed polepieces which are aligned along a rotational direction of said armature and faced to said armature, the trailing one of said two polepieces in said rotational direction of said armature having a larger cross-sectional area of the magnetic path than the leading one of said polepieces.

3. A rotary machine according to claim 2 wherein a portion of said stator core opposing to said leading polepiece has a larger cross-sectional area of the magnetic path than a portion of the same opposing to said trailing polepiece.

4. A rotary machine according to claim 2 wherein said stator core is formed with notches at portions on its outer periphery corresponding to said magnetic poles, each of said notches being slightly deviated from the geometrical centerline of a corresponding one of said magnetic poles.

5. A rotary machine according to claim 2 wherein said two polepieces are opposing to said armature with a gap, said gap being gradually widened along the rotational direction.

6. A rotary machine according to claim 3 wherein said stator core is formed with notches at portions on its outer periphery corresponding to said magnetic poles, each of said notches being slightly deviated in the rotational direction from the geometrical center line of a corresponding one of said magnetic poles.

7. A rotary machine according to claim 2 further comprising brushes positioned on portions of said armature where the flux density of the magnetic field therethrough are substantially a minimum.

8. A rotary machine as defined in claim 1 wherein the opposed core adjacent the polepiece which extends in the direction of rotation of the armature has a cross-sectional area which is larger relative to the cross-sectional area of the opposed core adjacent the pole piece which extends in the direction of reversal of the armature.

9. A rotary machine as defined in claim 1 wherein notches are formed on the outer peripheral portions of said magnetic poles at positions spaced from the line of symmetry of said poles in the direction of reversal of the armature.

10. A rotary machine as defined in claim 1 wherein a gap is formed between each pole piece and the adjacent opposed core, the gaps formed by the polepieces extending in the direction of rotation of the armature having a larger width than the gaps formed by the polepieces extending in the direction of reversal of the armature.

* * * * *